(12) United States Patent
Sato et al.

(10) Patent No.: US 12,023,724 B2
(45) Date of Patent: Jul. 2, 2024

(54) METHOD FOR INSTALLING DIVIDED UPPER TOOL TO UPPER TOOL HOLDER PROVIDED ON UPPER TABLE OF PRESS BRAKE, TOOL CHANGER, AND TOOL STOCKER

(71) Applicant: Amada Co., Ltd., Kanagawa (JP)

(72) Inventors: Masaaki Sato, Kanagawa (JP); Shiro Hayashi, Kanagawa (JP); Shingo Kamada, Kanagawa (JP); Hideto Yamada, Kanagawa (JP); Yohei Yamaguchi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 845 days.

(21) Appl. No.: 17/259,418

(22) PCT Filed: Jul. 17, 2019

(86) PCT No.: PCT/JP2019/028038
§ 371 (c)(1),
(2) Date: Jan. 11, 2021

(87) PCT Pub. No.: WO2020/017541
PCT Pub. Date: Jan. 23, 2020

(65) Prior Publication Data
US 2021/0252578 A1    Aug. 19, 2021

(30) Foreign Application Priority Data

Jul. 17, 2018  (JP) ................................. 2018-134151
Jul. 17, 2018  (JP) ................................. 2018-134168
(Continued)

(51) Int. Cl.
*B23Q 3/155*     (2006.01)
*B21D 5/02*      (2006.01)
(Continued)

(52) U.S. Cl.
CPC ............. *B21D 5/0254* (2013.01); *B21D 5/02* (2013.01); *B21D 5/0209* (2013.01);
(Continued)

(58) Field of Classification Search
CPC .. Y10T 483/1729–1731; B21D 5/0254; B21D 37/145
(Continued)

(56) References Cited

U.S. PATENT DOCUMENTS 7,168,286 B1   1/2007  Pelech
7,632,224 B2   12/2009 Rouweler et al.
(Continued)

FOREIGN PATENT DOCUMENTS

CN   101081478 A   12/2007
CN   105992658 A   10/2016
(Continued)

OTHER PUBLICATIONS

Extended European Search Report for corresponding EP Application No. 19838058.6, dated Aug. 6, 2021.
(Continued)

*Primary Examiner* — Erica E Cadugan
(74) *Attorney, Agent, or Firm* — Renner, Otto, Boisselle & Sklar, LLP

(57) ABSTRACT

In an installing method for installing divided upper tools to upper tool holders disposed to be spaced at an appropriate interval in a left-right direction in a lower portion of an upper table of a press brake, by using a tool changer, a round bar-shaped finger provided in the tool changer is engaged in a circular engagement hole provided at a central portion in the lateral direction of each divided upper tool. The divided upper tool is temporarily positioned in a gap between an upper tool holder to which the divided upper tool is to be installed, and an adjacent upper tool holder. The temporarily
(Continued)

positioned divided upper tool is moved in the left-right direction to be installed to the upper tool holder to which the divided upper tool is to be installed.

2 Claims, 12 Drawing Sheets

(30) Foreign Application Priority Data

| | | |
|---|---|---|
| Jul. 27, 2018 | (JP) | 2018-140886 |
| Sep. 11, 2018 | (JP) | 2018-169366 |
| May 7, 2019 | (JP) | 2019-087437 |
| May 16, 2019 | (JP) | 2019-092892 |
| Jun. 12, 2019 | (JP) | 2019-109717 |
| Jun. 14, 2019 | (JP) | 2019-111277 |
| Jul. 8, 2019 | (JP) | 2019-126935 |

(51) Int. Cl.
  *B21D 37/04* (2006.01)
  *B21D 37/14* (2006.01)

(52) U.S. Cl.
  CPC ........... *B21D 5/0236* (2013.01); *B21D 37/04* (2013.01); *B21D 37/145* (2013.01); *B23Q 3/15573* (2013.01); *Y10T 483/10* (2015.01); *Y10T 483/1731* (2015.01)

(58) Field of Classification Search
  USPC ...................................................... 483/28–29
  See application file for complete search history.

(56) References Cited

U.S. PATENT DOCUMENTS

| | | | |
|---|---|---|---|
| 10,500,623 B2 | 12/2019 | Meneghetti | |
| 2003/0064871 A1 | 4/2003 | Akami | |
| 2007/0271987 A1 | 11/2007 | Shimizu et al. | |
| 2007/0297889 A1 | 12/2007 | Rouweler et al. | |
| 2014/0123723 A1* | 5/2014 | Yoshida | B21D 5/0254 72/389.1 |
| 2014/0326036 A1 | 11/2014 | Hayashi | |
| 2015/0174633 A1 | 6/2015 | Sato | |
| 2016/0354821 A1 | 12/2016 | Meneghetti | |
| 2017/0297073 A1* | 10/2017 | Sato | B21D 5/0254 |

FOREIGN PATENT DOCUMENTS

| | | | |
|---|---|---|---|
| CN | 106 734 644 A | | 5/2017 |
| DE | 100 60 405 B4 | | 3/2007 |
| EP | 1 160 024 A1 | | 12/2001 |
| EP | 1862255 A1 | | 12/2007 |
| JP | S58 76326 U | | 5/1983 |
| JP | 04-158926 A | * | 6/1992 |
| JP | 07-116734 A | * | 5/1995 |
| JP | H09 220618 A | | 8/1997 |
| JP | H10211521 A | | 8/1998 |
| JP | H10263708 A | | 10/1998 |
| JP | 11-10235 A | | 1/1999 |
| JP | 2000071028 A | | 3/2000 |
| JP | 2004337950 A | | 12/2001 |
| JP | 2006000855 A | | 1/2006 |
| JP | 4672868 B | | 4/2011 |
| JP | 2013-86149 A | | 5/2013 |
| JP | 2013111610 A | | 6/2013 |
| JP | 2014-4604 A | | 1/2014 |
| JP | 2015-120185 A | | 7/2015 |
| JP | 2017-508623 A | | 3/2017 |
| WO | 2008050458 A1 | | 5/2008 |
| WO | 2015118505 A3 | | 8/2015 |
| WO | 2016/023057 A1 | | 2/2016 |
| WO | 2016/054668 A1 | | 4/2016 |
| WO | 2017212386 A1 | | 12/2017 |
| WO | 2018065965 A1 | | 4/2018 |

OTHER PUBLICATIONS

Extended European Search Report for corresponding EP Application No. 19838694.8, dated Aug. 6, 2021.
European Search Report for corresponding Application No. 20805835.4, mailed May 30, 2022.
European Search Report for corresponding Application No. 20802239.2, mailed May 23, 2022.
International Search Report for corresponding Application No. PCT/JP2019/028038, mailed Oct. 21, 2019.
Written Opinion for corresponding Application No. PCT/JP2019/028038, mailed Oct. 21, 2019.
Extended European Search Report for corresponding EP Application No. 19837688.1, mailed Aug. 2, 2021.
Extended European Search Report for corresponding EP Application No. 19837570.1, dated Aug. 12, 2021.

* cited by examiner

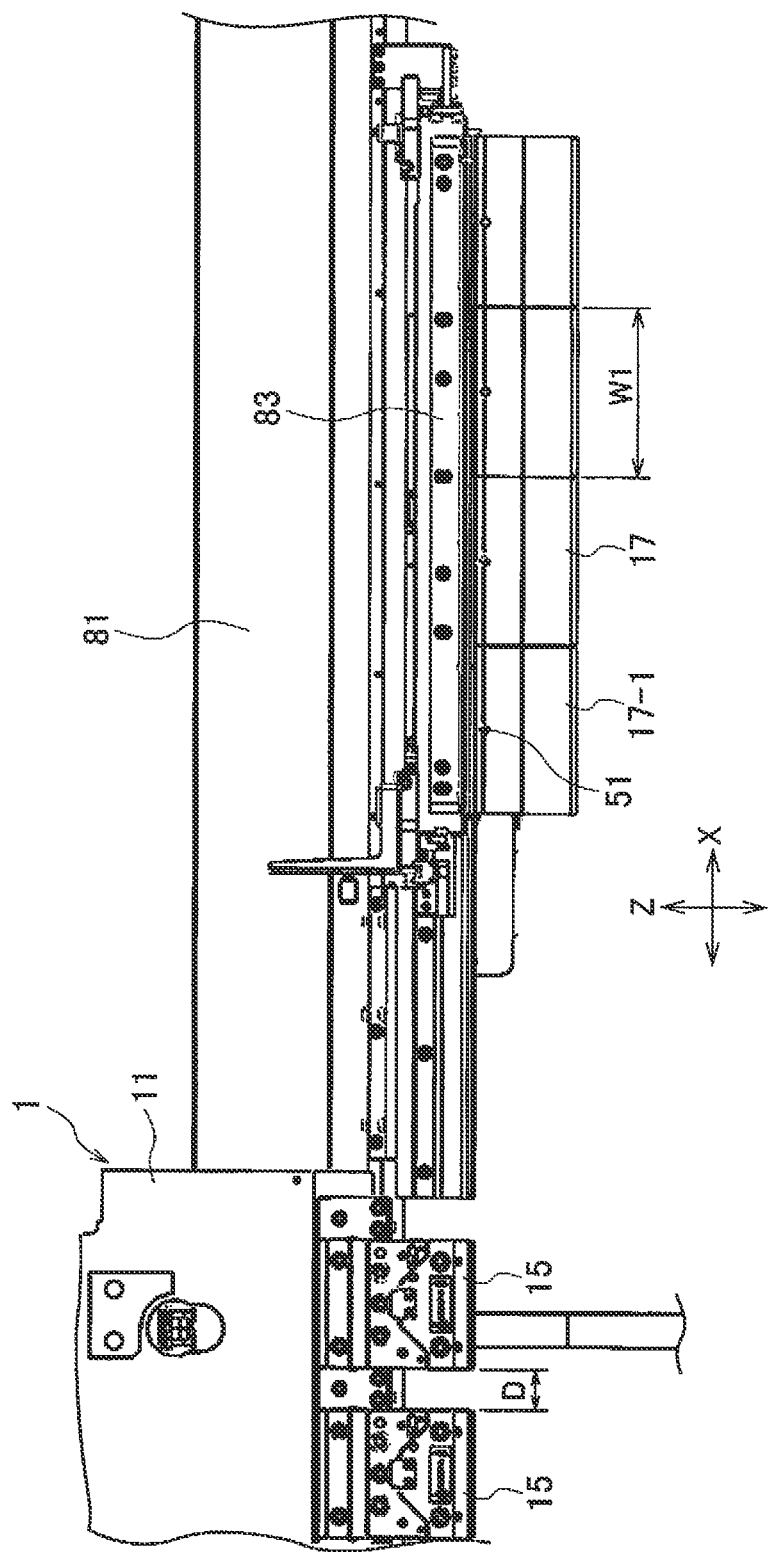

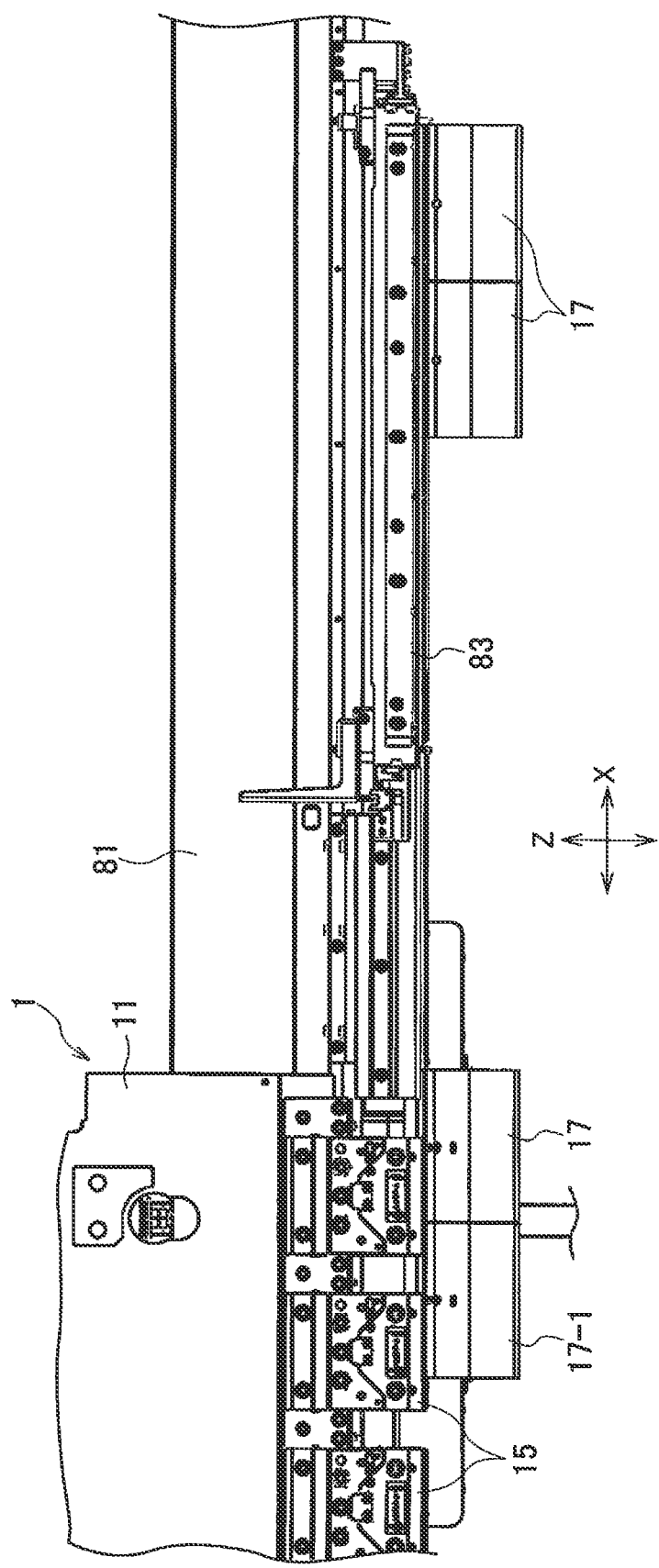

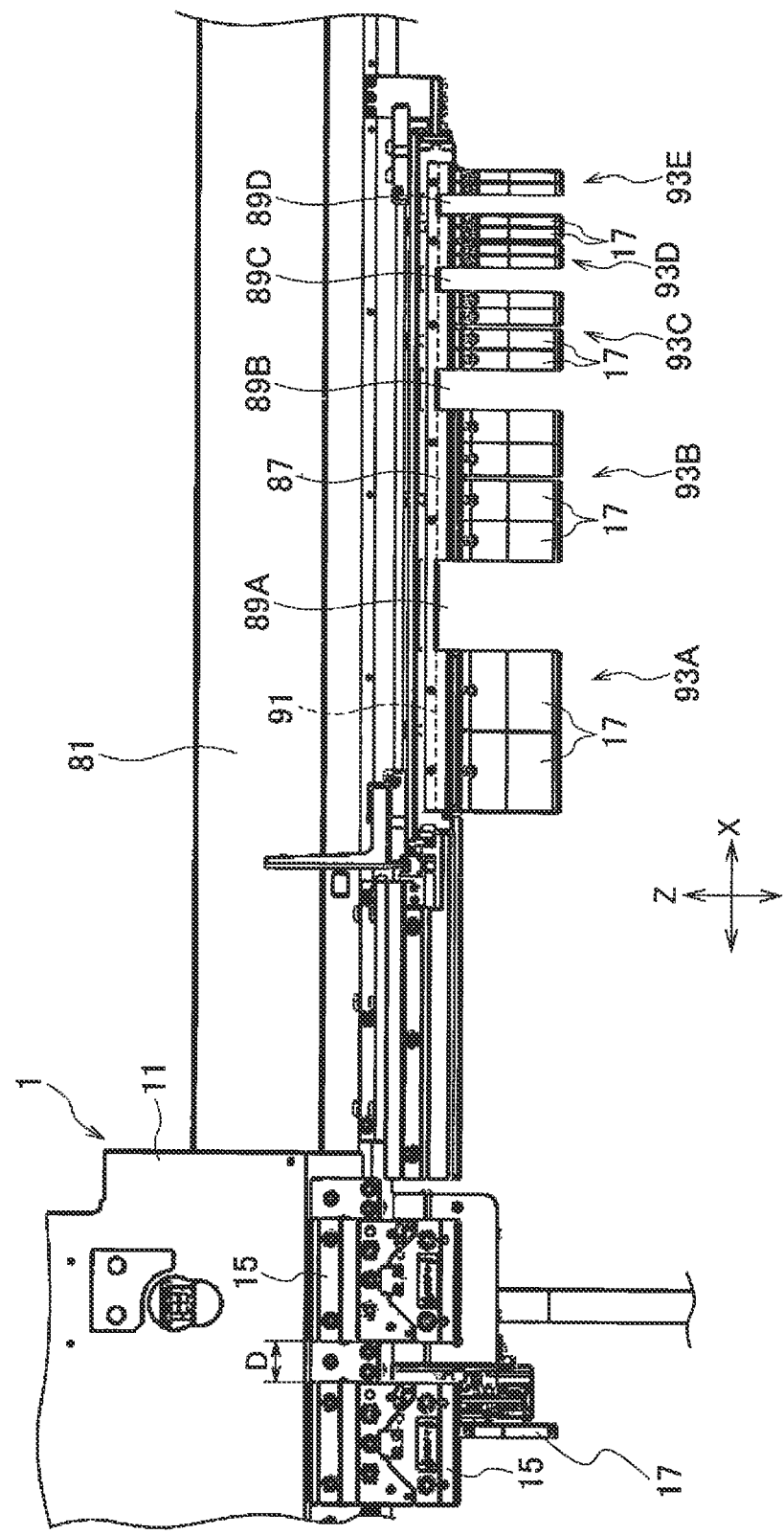

METHOD FOR INSTALLING DIVIDED UPPER TOOL TO UPPER TOOL HOLDER PROVIDED ON UPPER TABLE OF PRESS BRAKE, TOOL CHANGER, AND TOOL STOCKER

TECHNICAL FIELD

The present disclosure relates to a divided upper tool installing method for installing divided upper tools to a plurality of upper tool holders provided to be spaced at an appropriate interval in the left-right direction in a lower portion of an upper table of a press brake, by using a tool changer, a tool changer, and a tool stocker. More specifically, the present disclosure relates to a method for inserting and temporarily positioning a divided upper tool in a gap between upper tool holders provided in an adjacent manner in the left-right direction in a lower portion of an upper table of a press brake, by a tool changer, and thereafter moving the divided upper tool in the left-right direction to install the divided upper tool to the upper tool holder, a tool changer, and a tool stocker.

BACKGROUND ART

An upper tool holder that detachably supports a divided upper tool is provided in a lower portion of an upper table in a press brake (see Patent Literatures 1, 2 and 3, for example).

CITATION LIST

Patent Literature

Patent Literature 1: Japanese Patent No. 4672868
Patent Literature 2: Japanese Patent Laid-Open No. 2013-86149
Patent Literature 3: Japanese Patent Laid-Open No. 2015-120185

SUMMARY

Patent Literature 1 describes a configuration in which an upper tool is installed/removed to/from an upper tool installing portion (upper tool holder) provided in a lower portion of an upper table, by using a tool changer.

Patent Literatures 2 and 3 each describe a configuration in which a plurality of upper tool holders (upper tool installing portions) are provided to be spaced at appropriate intervals in the left-right direction in a lower portion of an upper table.

The configuration described in Patent Literature 2 is a configuration in which an attachment portion provided in an upper portion of the upper tool is pressed and fixed to an upper tool supporting portion provided in a main body by rotating the lower side of an upper tool clamp in the closing direction by operating a pressing actuator provided in the main body of each upper tool holder. The configuration described in Patent Literature 3 is a configuration in which an upper tool is fixed and released by opening and closing a clamp (there is no equal sign in Patent Literature 3) corresponding to the upper tool clamp described in Patent Literature 2 by rotating, in the left-right direction, a lever provided at a central portion in the left-right direction of each upper tool holder.

As described in each of Patent Literatures 2 and 3, in the configuration in which the upper tool holders are provided to be spaced appropriately apart in the left-right direction in the lower portion of the upper table, the upper tool is manually installed to and removed from each upper tool holder. Therefore, even in the configuration in which the upper tool holders are provided to be spaced appropriately apart in the left-right direction in the lower portion of the upper table, the upper tool is desirably installed to and removed from each upper tool holder by using the tool changer.

Here, in a case where the tool exchanging method described in Patent Literature 1 is applied to the press brake described in each of Patent Literatures 2 and 3, the configuration of the upper tool and the tool installing portion (tool holder) described in Patent Literature 1 is configured on the assumption that a tool changer is used. Therefore, it cannot be applied to a configuration on the assumption that tool exchange is manually performed, such as the configurations described in Patent Literatures 2 and 3.

That is, the upper tool installing portion (tool installing portion) provided in the lower portion of the upper table described in Patent Literature 1 is provided over the entire length corresponding to the width dimension in the left-right direction of the upper table. The upper tool installing portion is provided with an installing groove over the entire length in the left-right direction. The divided tool is installed and removed in the vertical direction by an automatic tool changer (ATC), so that the upper tool installing portion and the divided tool are configured not to accidentally fall.

In other words, the configuration is based on the assumption that an ATC is used.

Therefore, the configuration described in Patent Literature 1 cannot be applied to the press brake described in each of Patent Literatures 2 and 3.

The present invention has been made in view of the aforementioned problems, and provides a method for installing divided upper tools to a plurality of upper tool holders held and provided at an appropriate interval in the left-right direction in a lower portion of an upper table of a press brake, by using a tool changer, a tool changer, and a tool stocker.

Therefore, according to a first aspect of one or more embodiments, there is provided a divided upper tool installing method for installing divided upper tools to upper tool holders disposed to be spaced at an appropriate interval in a left-right direction in a lower portion of an upper table of a press brake, by using a tool changer, the divided upper tool installing method including: (a) engaging a rod-shaped finger provided in the tool changer in an engagement hole provided at a central portion in the left-right direction of each of the divided upper tools supported by a tool stocker, and removing the divided upper tools from the tool stocker one by one; (b) temporarily positioning the removed divided upper tool in a gap between an upper tool holder to which the divided upper tool is to be installed, and an adjacent upper tool holder by the tool changer; (c) moving the temporarily positioned divided upper tool in the left-right direction, and temporarily positioning an attachment portion provided in the divided upper tool between an upper tool supporting portion provided in the upper tool holder to which the divided upper tool is to be installed and an upper tool clamp provided in the upper tool holder; (d) separating the finger from the engagement hole of the temporarily positioned divided upper tool; and (e) fixing the attachment portion of the temporarily positioned divided upper tool to the upper tool holder.

According to a second aspect of one or more embodiments, there is provided a divided upper tool installing method for installing divided upper tools to upper tool holders disposed to be spaced at an appropriate interval in a left-right direction in a lower portion of an upper table of a press brake, by using a tool changer, the divided upper tool installing method including: (a) engaging a rod-shaped finger provided in the tool changer in an engagement hole provided at a central portion in the left-right direction of each of the divided upper tools supported by a tool stocker, and removing the divided upper tools from the tool stocker one by one; (b) moving the tool changer in the left-right direction, and causing an attachment portion of the removed divided upper tool to pass between an upper tool supporting portion and an upper tool clamp provided in an upper tool holder closest to the tool stocker in the left-right direction; (c) temporarily positioning the attachment portion of the divided upper tool to be installed between the upper tool supporting portion and the upper tool clamp provided in an upper tool holder to which the divided upper tool is to be installed; (d) separating the finger from the engagement hole of the temporarily positioned divided upper tool; and (e) fixing the attachment portion of the temporarily positioned divided upper tool to the upper tool holder.

According to a third aspect of one or more embodiments, there is provided a divided upper tool installing method for installing a plurality of divided upper tools supported by a tool stocker to a plurality of upper tool holders, the upper tool holders being provided to be spaced at an appropriate interval in a left-right direction in a lower portion of an upper table of a press brake, the tool stocker detachably supporting the divided upper tools being provided on one side in the left-right direction of the upper table, the divided upper tool installing method including: (a) engaging a rod-shaped finger provided in a tool changer in an engagement hole provided in each of the divided upper tools supported by the tool stocker, the tool changer being movable in the left-right direction from a back side of the upper table to a back side of the tool stocker; (b) moving, in the left-right direction, the divided upper tool engaged with the finger, and moving the divided upper tool to a position of a cutout formed in the tool stocker; (c) moving the tool stocker upward, and removing the divided upper tool with the finger inserted therein, relatively downward from the tool stocker; (d) moving the tool changer in the left-right direction, and temporarily positioning an attachment portion of the divided upper tool held by the finger between an upper tool supporting portion and an upper tool clamp of the upper tool holder provided in the upper table; (e) separating the finger from the engagement hole of the temporarily positioned divided upper tool; and (f) fixing the attachment portion of the temporarily positioned divided upper tool to the upper tool holder.

According to the third aspect of one or more embodiments, there is provided a divided upper tool installing method for installing a plurality of divided upper tools supported by a tool stocker to a plurality of upper tool holders, the upper tool holders being provided to be spaced at an appropriate interval in a left-right direction in a lower portion of an upper table of a press brake, the tool stocker detachably supporting the divided upper tools being provided on one side in the left-right direction of the upper table, the divided upper tool installing method including: (a) engaging a rod-shaped finger provided in a tool changer in an engagement hole provided at a central portion in the left-right direction of each of the divided upper tools supported by the tool stocker, the tool changer being movable in the left-right direction from a back side of the upper table to a back side of the tool stocker; (b) moving, in the left-right direction, the divided upper tool engaged with the finger, and moving the divided upper tool to a position of a cutout formed in the tool stocker; (c) removing the divided upper tool engaged with the finger backward from the cutout; (d) moving, in the left-right direction, the divided upper tool removed backward, and temporarily positioning the divided upper tool in a gap between an upper tool holder to which the divided upper tool is to be installed, and an adjacent upper tool holder; (e) moving, in the left-right direction, the divided upper tool temporarily positioned in the gap, and temporarily positioning an attachment portion provided in the divided upper tool between an upper tool supporting portion and an upper tool clamp of the upper tool holder to which the divided upper tool is to be installed, and separating the finger from the engagement hole of the divided upper tool; and (f) fixing the attachment portion of the temporarily positioned divided upper tool to the upper tool holder.

According to a fourth aspect of one or more embodiments, there is provided a tool changer including a moving member configured to freely reciprocate between a position corresponding to each of a plurality of upper tool holders disposed to be spaced at an appropriate interval in a left-right direction in a lower portion of an upper table of a press brake and a position corresponding to a tool stocker detachably supporting a plurality of divided upper tools, wherein a rod-shaped finger freely engageable in a front-back directional engagement hole provided at a central portion in the left-right direction of each of the divided upper tools is provided in the moving member. This tool changer can be used for the aforementioned divided upper tool installing method.

According to the fourth aspect of one or more embodiments, there is provided a tool stocker including a stocker main body configured to support divided upper tools movably in a left-right direction, wherein a cutout for removing the divided upper tools downward or in a front-back direction one by one is provided in the stocker main body. This tool stocker can be used for the aforementioned divided upper tool installing method.

According to the present invention, the divided upper tool is temporarily positioned in the gap adjacent to the upper tool holder to which the divided upper tool is to be installed, by the tool changer, and this divided upper tool is moved in the left-right direction to be installed to the upper tool holder to which the divided upper tool is to be installed. Therefore, the divided upper tool can be installed to the upper tool holder promptly.

BRIEF DESCRIPTION OF DRAWINGS

FIG. 7 is an explanatory view of an action in a case where a divided upper tool supported by a stocker main body is installed to an upper tool holder.

FIG. 8 is an explanatory view of an action in a case where the divided upper tool supported by the stocker main body is installed to the upper tool holder.

FIG. 9 is an explanatory view of an action in a case where a divided upper tool supported by a stocker main body according to a second embodiment is installed to an upper tool holder.

DESCRIPTION OF EMBODIMENT

A first embodiment of the present invention will be hereinafter described using the drawings. First, in order to facilitate understanding, relationship between a press brake and a tool storage that stores a tool to be exchanged will be roughly described.

Figure 1:
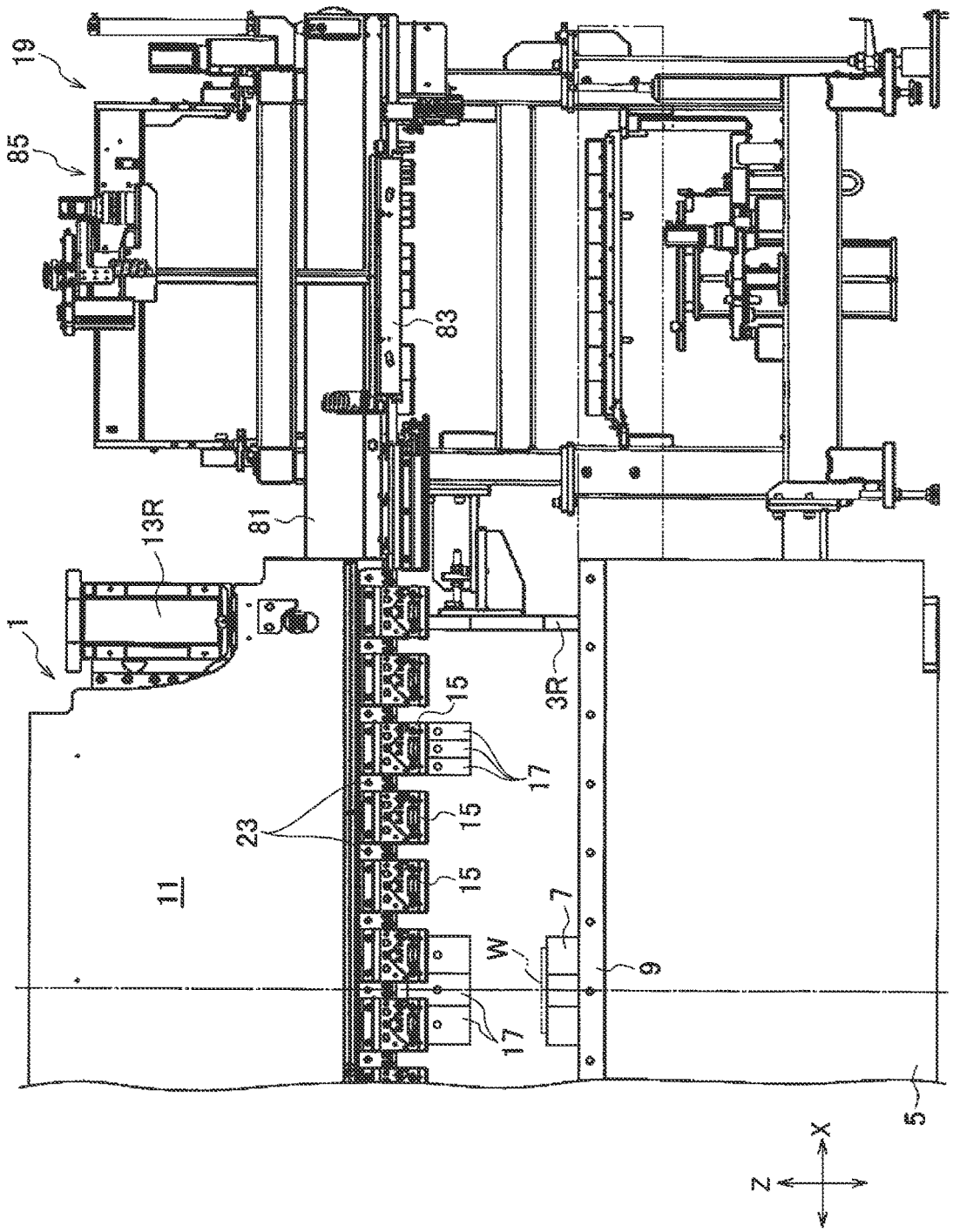
FIG. 1 is a frontal explanatory view illustrating relationship between a press brake and a tool storage according to an embodiment of the present invention.

A configuration of the press brake is well known. Since the press brake is symmetrical, a configuration on the left side of the press brake is omitted in FIG. 1. Therefore, in general, as illustrated in FIG. 1, a press brake 1 has a C-shaped side frame 3R on the right side. A lower table 5 is integrally attached to a lower portion on the front side of the side frame 3R. A lower tool installing portion 9 that allows a divided lower tool 7 to be detachably installed is provided on an upper portion of this lower table 5.

The upper table 11 vertically facing the lower table 5 is provided on an upper portion on the front side of the side frame 3R movably in the vertical direction. In order to move the upper table 11 vertically, for example, a right vertical motion actuator 13R such as a hydraulic cylinder and a servo motor is provided on the upper portion of the side frame 3R.

A plurality of upper tool holders 15 that are spaced at appropriate intervals in the left-right direction (X-axis direction) are provided in the lower portion of the upper table 11. The upper tool holders 15 each have a function of detachably holding the divided upper tool 17. The configuration of each upper tool holder 15 is the same as the configuration of the upper tool holder described in Patent Literature 2, and is known. Therefore, the details of the upper tool holders 15 will be omitted.

With the above configuration, a plate-shaped workpiece W is placed and positioned on the divided lower tool 7 installed to the lower table 5. Then, by lowering the upper table 11, the divided lower tool 7 and the divided upper tools 17 work together to bend the workpiece W.

A tool storage 19 that stores the divided lower tools 7 installed to and removed from the lower tool installing portion 9 and the divided upper tools 17 installed to and removed from the upper tool holders 15 is provided close to one side in the left-right direction of the press brake 1. A lower tool changer (not illustrated in FIG. 1) for exchanging each divided lower tool 7 between the press brake 1 and the tool storage 19, and an upper tool changer (automatic tool changer: ATC) 20 (see FIG. 2) for exchanging each divided upper tool 17 are provided.

More specifically, a guide rail 21 elongated in the left-right direction (X-axis direction) is provided on the back side of the upper table 11 (on the right side in FIG. 2) in order to install and remove the divided upper tools 17 to and from the upper tool holders 15.

That is, a plurality of girder members 23 protruding backward (in the right direction in FIG. 2) are provided between the appropriate upper tool holders 15 in the X-axis direction (left-right direction) in the lower portion of the upper table 11. A beam member 25 extended in the left-right direction (X-axis direction) is horizontally provided at a tip (back end) of each girder member 23. A rack 27 elongated in the X-axis direction is provided on a lower surface of the above beam member 25. This rack 27 is provided with the guide rail 21 in the X-axis direction.

A box-shaped first slider 31 as a moving member is movably supported on the guide rail 21 via linear sliders 29. In order to move the first slider 31 in the X-axis direction and position the first slider 31, the first slider 31 is provided with a servo motor 33. A pinion gear 35 (see FIG. 3, and the rack 27 and the guide rail 21 are not illustrated in FIG. 3) that is rotationally driven by this servo motor 33 meshes with the rack 27. Therefore, by the rotation of the servo motor 33, the first slider 31 is reciprocated in the X-axis direction and is positioned at a desired position.

The guide rail 21, the beam member 25, and the rack 27 extend long over the inside of the tool storage 19. Therefore, the first slider 31 can reciprocate in the X-axis direction from the back side of the press brake 1 to the inside of the tool storage 19.

A base plate 37 (see FIG. 3) is vertically integrated on one side in the X-axis direction of the first slider 31. A second slider 41 is supported on a Y-axis directional guide member 39 provided on this base plate 37 movably in the Y-axis direction. The second slider 41 is provided with a reciprocating device 43 in order to move the second slider 41 in the Y-axis direction.

Various configurations can be adopted for this reciprocating device 43. However, in this embodiment, the above reciprocating device 43 is illustrated as a hydraulic cylinder. A tip 43E of a piston rod 43P provided in the hydraulic cylinder 43 so as to freely reciprocate is coupled to a bracket 37A provided so as to be integrally coupled to the base plate 37. Therefore, the second slider 41 can be reciprocated in the Y-axis direction with respect to the base plate 37 by driving the hydraulic cylinder 43.

A third slider 45 is provided in the second slider 41 so as to freely reciprocate in the Y-axis direction via a guide member (not illustrated) in the Y-axis direction. In order to reciprocate this third slider 45, the piston rod 47P provided in the hydraulic cylinder 47 installed to the second slider 41 and serving as a reciprocating device so as to freely reciprocate is coupled to a protrusion 45P provided on the third slider 45. Therefore, the third slider 45 is reciprocated in the Y-axis direction by the operation of the hydraulic cylinder 47.

A supporting block 49 is integrally provided on the front side in the front-back direction (Y-axis direction) of the third slider 45. This supporting block 49 includes a rod-shaped finger 53 that protrudes forward (to the left in FIGS. 2 and 3). The rod-shaped finger 53 is freely insertable and engageable into a front-back directional through hole 51 as an example of an engagement hole provided at a central portion in the left-right direction (X-axis direction) of the divided upper tool 17.

Figure 2:
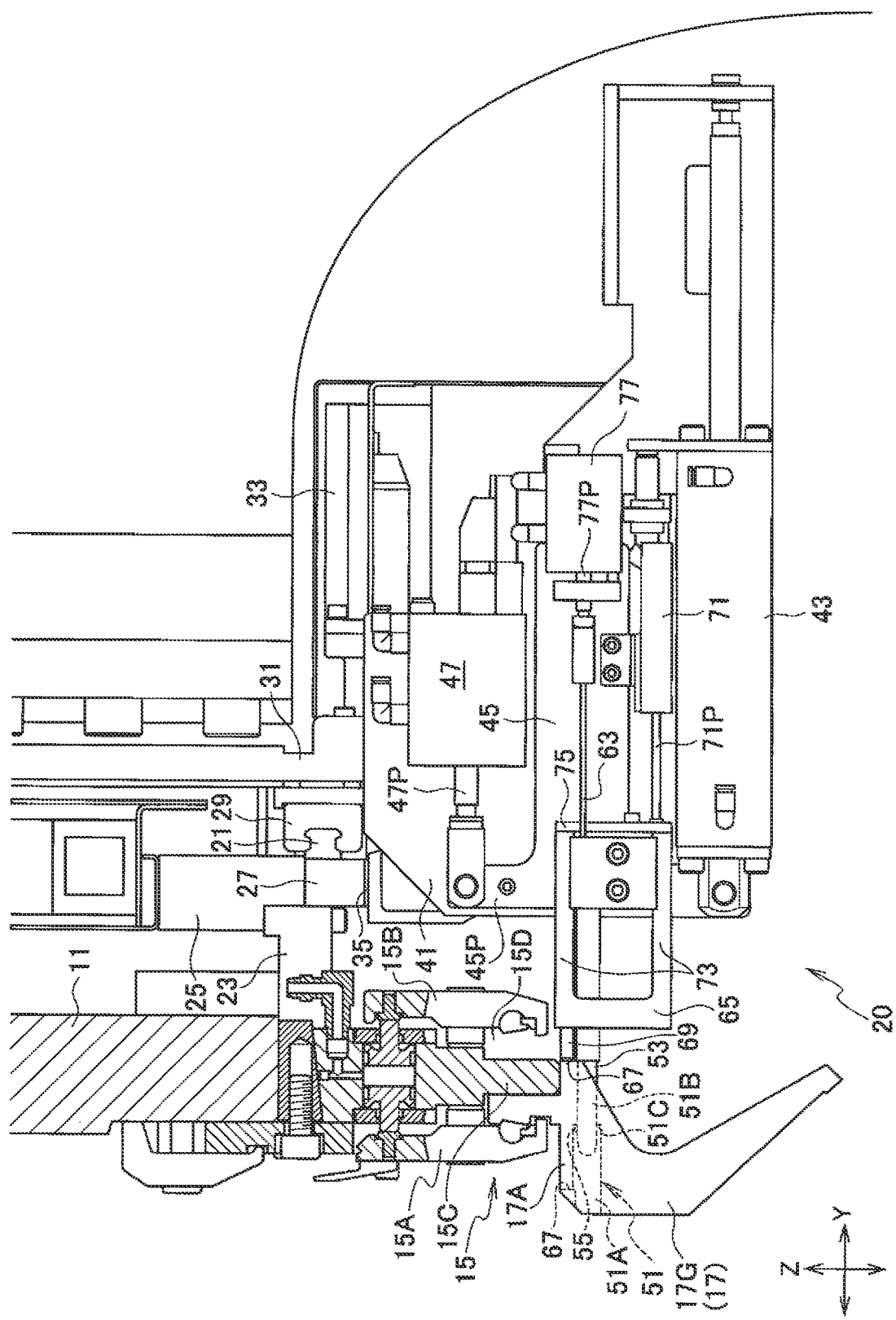
FIG. 2 is an explanatory view of an action when an upper tool is installed to and removed from a tool attachment portion by an ATC.
Figure 3:
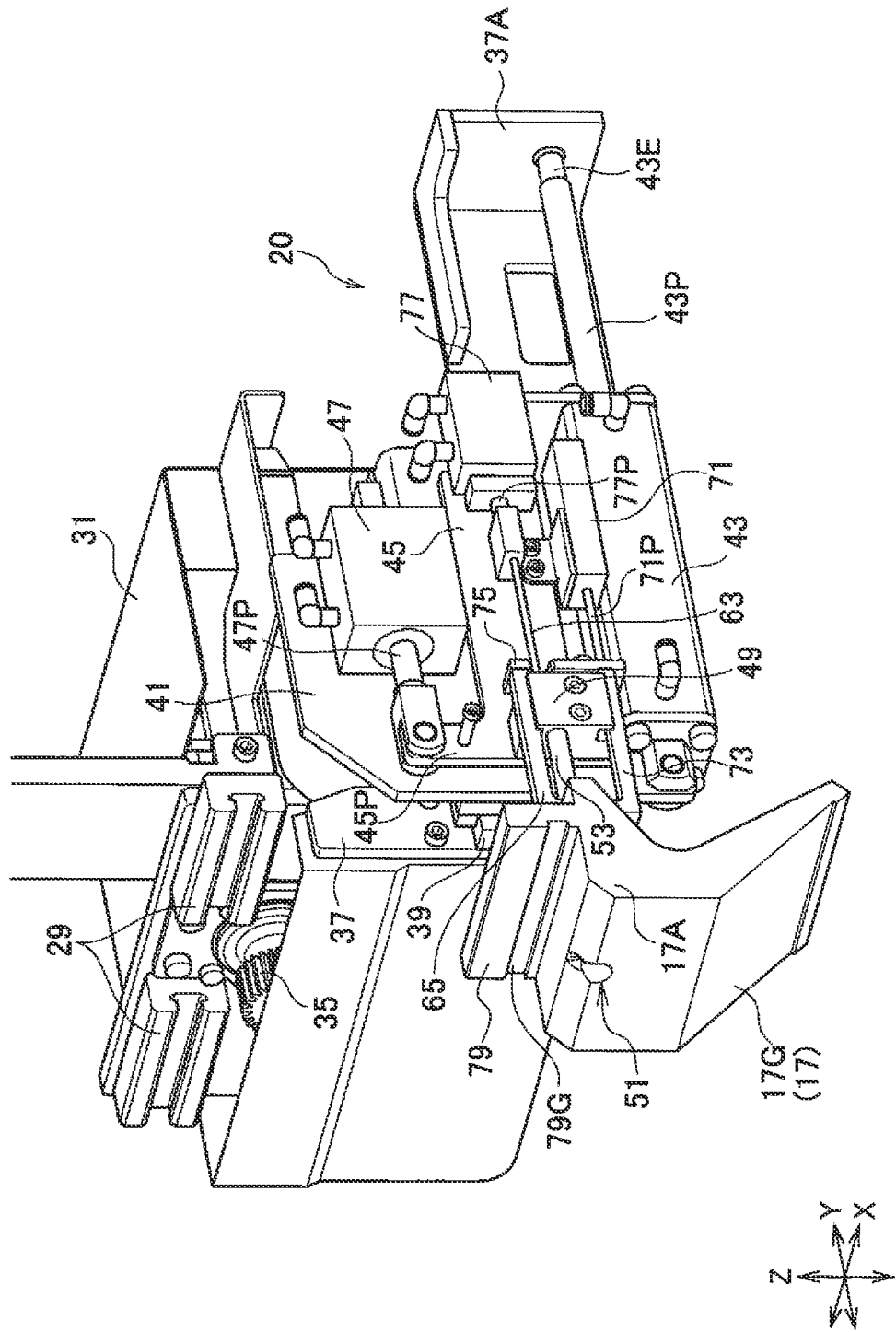
FIG. 3 is a perspective explanatory view illustrating a state in which the upper tool is held by the ATC.

The divided upper tool 17 is illustrated by a gooseneck tool 17G in FIGS. 2 and 3. A thick portion 17A of the gooseneck tool 17G (see FIG. 2) is formed to be thicker in the front-back direction than a thick portion 17A of a general divided upper tool 17 (see FIG. 4). Therefore, as illustrated in FIG. 2, the through hole (engagement hole) 51 communicates a large-diameter hole 51A and a small-diameter hole 51B. A stepped portion 51C is formed in a connecting portion between the large-diameter hole 51A and the small-diameter hole 51B.

A locking piece (engagement piece) 55 capable of being protruded from and retracted into an outer circumferential surface on the tip side of the finger 53 is provided on the tip side of the finger 53, in order to support the gooseneck tool 17G so as not to cause the gooseneck tool 17G to fall when the finger 53 is inserted into the through hole 51 of the gooseneck tool 17G.

That is, the finger 53 is formed into a round-bar shape in this embodiment. The finger 53 includes a small-diameter portion 53A that is freely insertable into the through hole 51 and located on the tip side and a large-diameter portion 53B on the base end side. A stepped portion 53C is formed between the small-diameter portion 53A and the large-diameter portion 53B. This stepped portion 53C is configured to abut on front and back surfaces 17F of the thick portion 17A of the divided upper tool 17 when the small-diameter portion 53A is inserted into the through hole 51 of the divided upper tool 17. This surface 17F corresponds to a front surface of the thick portion 17A when the finger 53 is inserted into the through hole 51 from the front side, and corresponds to a back surface of the thick portion 17A when the finger 53 is inserted into the through hole 51 from the back side.

Figure 5:
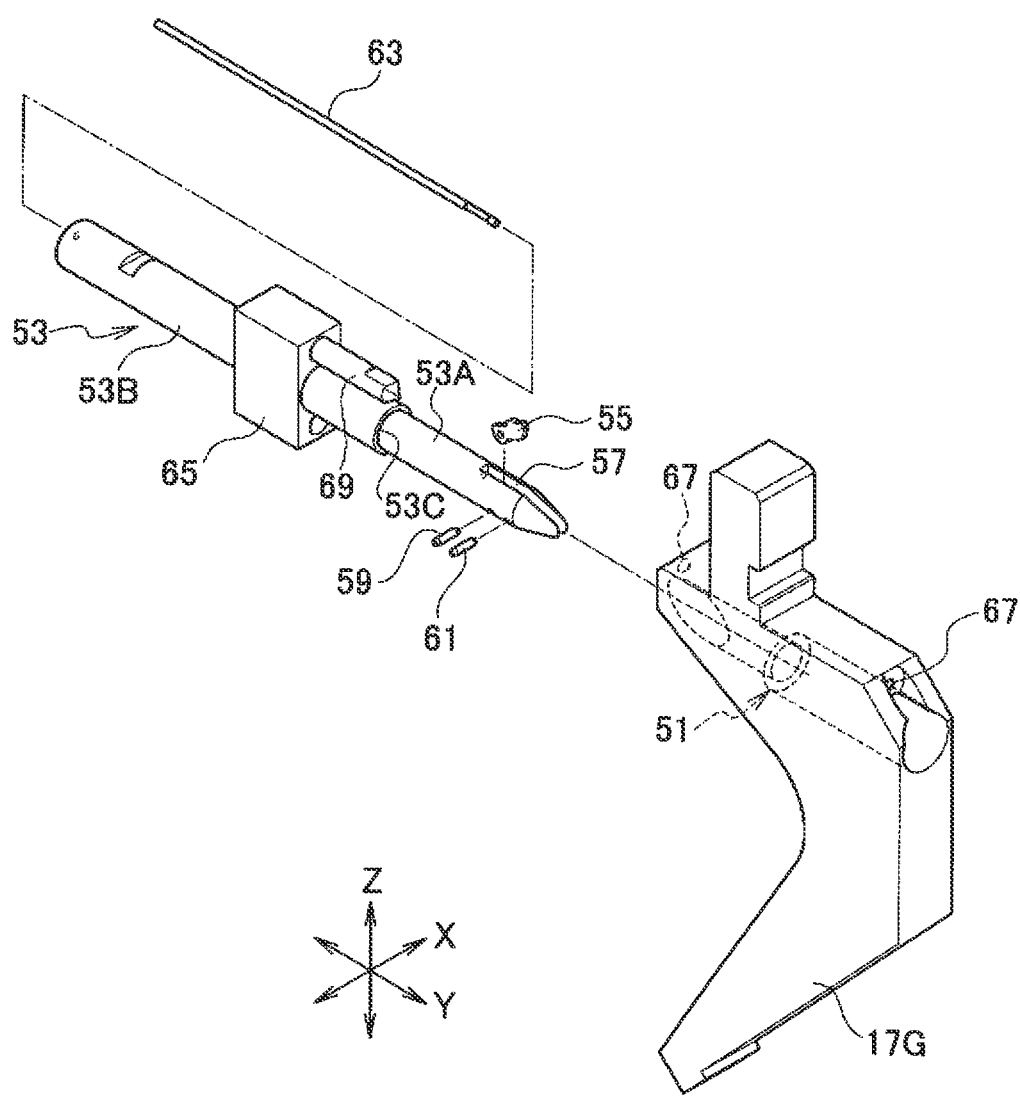
FIG. 5 is an explanatory view illustrating relationship between a finger and the upper tool in the ATC.

More specifically, as illustrated in FIG. 5, a longitudinal slit 57 is formed on the tip side of the finger 53. A locking piece 55 is vertically rotatably provided in this slit 57 via a pivot pin 59 in the direction orthogonal to the longitudinal direction of the finger 53. The slit 57 is provided with a stopper 61 that limits immersion of the locking piece 55 with respect to an outer circumferential surface of the finger 53. In order to perform the protruding/retracting operation of the locking piece 55 on the outer circumferential surface of the finger 53, the finger 53 is provided with an operating rod 63 such that the operating rod 63 is movable in the longitudinal direction (the Y-axis direction, the front-back direction).

Figure 6A:
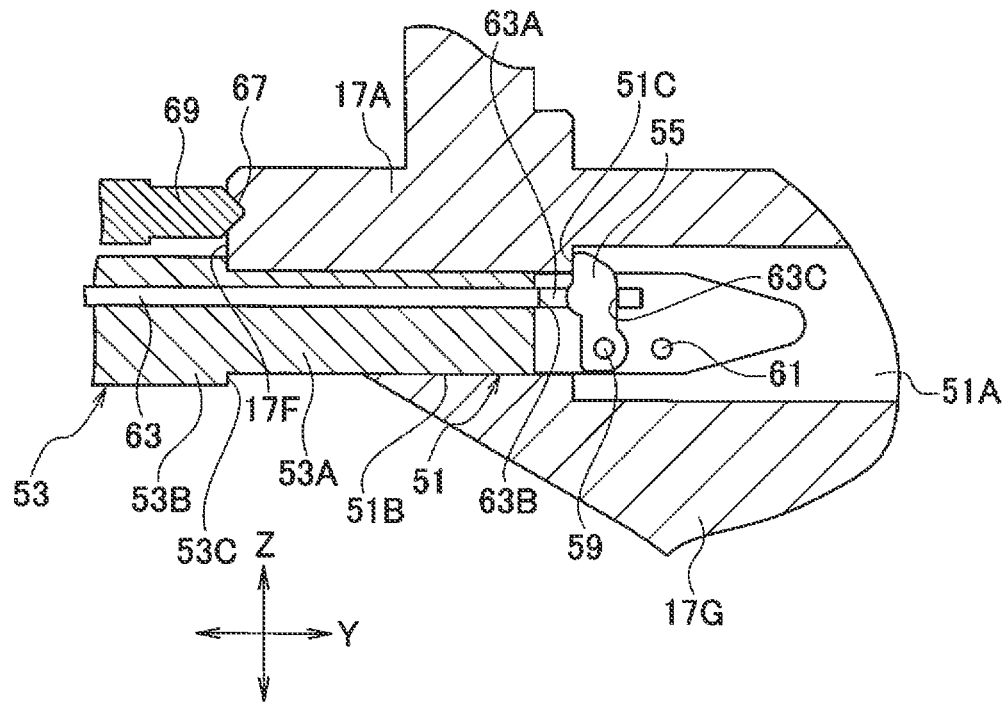
FIG. 6A is an operation explanatory view of a locking piece provided in the finger.
Figure 6B:
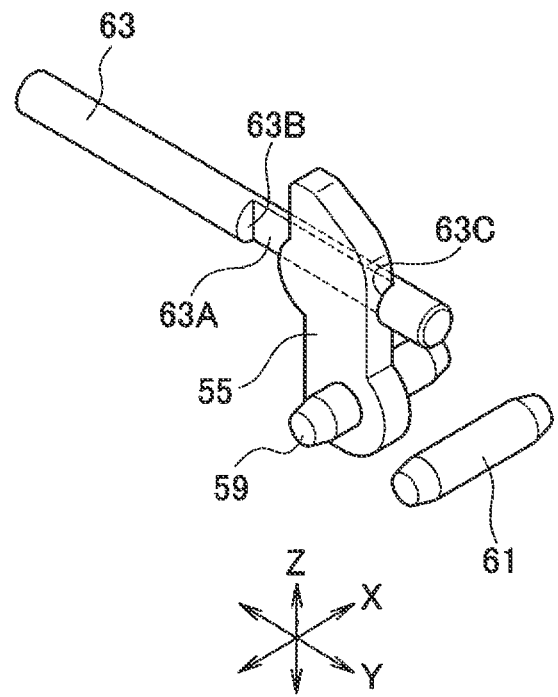
FIG. 6B is an operation explanatory view of the locking piece provided in the finger.

A tip of the operating rod 63 is provided with a cutout 63A, as illustrated in FIGS. 6A and 6B. The cutout 63A is formed with a push face 63B for performing rotating operation so as to immerse the locking piece 55 with respect to the outer circumferential surface of the finger 53. Further, in the cutout 63A, a pull face 63C for performing rotating operation so as to protrude the locking piece 55 from the outer circumferential surface of the finger 53 is formed so as to face the push face 63B. Therefore, it is possible to perform the protruding/retracting operation of the locking piece 55 with respect to the outer circumferential surface of the finger 53 by reciprocating the operating rod 63 in the longitudinal direction.

Figure 4:
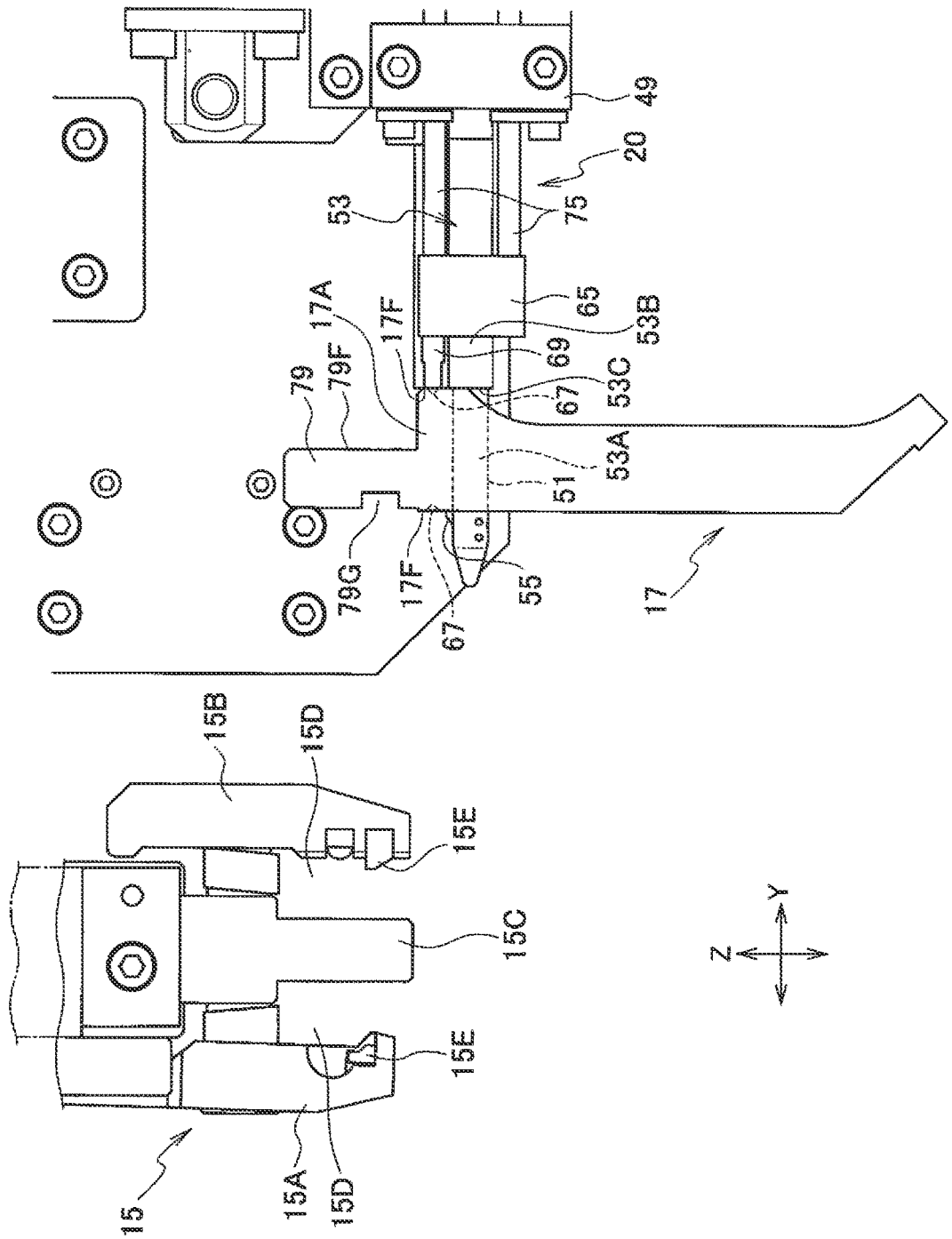
FIG. 4 is an explanatory view of an action when the upper tool is installed to and removed from the tool attachment portion by the ATC.

As illustrated in FIG. 5, an outer circumference of the large-diameter portion 53B of the finger 53 is provided with a slide block 65 as a front-back moving member that is movable in the longitudinal direction of the finger 53. This slide block 65 has the same function although the forms illustrated in FIGS. 2 and 4 are different. The slide block 65 is provided with a pin-shaped anti-rotation member 69 that engages with anti-rotation portions 67 provided in the divided upper tool 17, 17G to achieve anti-rotation of the divided upper tool 17, 17G.

That is, when the small-diameter portion 53A of the finger 53 is inserted into the through hole 51 in the divided upper tool 17 (17G), the stepped portion 53C of the finger 53 abuts on the front surface 17F or the back surface 17F of the divided upper tool 17 (17G). Then, the locking piece 55 and the like provided on the tip side of the small-diameter portion 53A protrudes to the outside from the through hole 51. Therefore, the locking piece 55 can be protruded from the outer circumferential surface of the finger 53 to engage the front surface 17F or the back surface 17F of the divided upper tool 17 (17G). The anti-rotation member 69 provided on the slide block 65 is engaged with the anti-rotation portion 67 provided on the back surface or the front surface opposite to a surface engaged by the locking piece 55, so that anti-rotation of the divided upper tool 17 (17G) centered on the finger 53 can be achieved.

The anti-rotation member 69 presses the divided upper tool 17, 17G toward the locking piece 55 when the locking piece 55 is in a state of protruding from the outer circumferential surface of the finger 53. In addition, the anti-rotation member 69 clamps the divided upper tool 17, 17G in cooperation with the locking piece 55.

A hydraulic cylinder 71 is attached to the third slider 45 as illustrated in FIG. 3 in order to reciprocate the slide block 65 along the finger 53. A piston rod 71P provided in the hydraulic cylinder 71 so as to freely reciprocate is coupled to a coupling member 75. The coupling member 75 is attached to a base end of a slide rod 73 slidably supported by the supporting block 49. The slide block 65 is provided on the tip side of the slide rod 73.

Therefore, by reciprocating the hydraulic cylinder 71, the slide block 65 is reciprocated with respect to the finger 53. The anti-rotation member 69 provided in the slide block 65 is disengaged from the anti-rotation portion 67 provided in the divided upper tool 17, 17G.

A hydraulic cylinder 77 is installed to the third slider 45 in order to reciprocate the operating rod 63 in the longitudinal direction. The operating rod 63 is coupled to a piston rod 77P provided in the hydraulic cylinder 77 so as to freely reciprocate.

Therefore, the operating rod 63 can be reciprocated in the Y-axis direction (front-back direction) by reciprocating the hydraulic cylinder 77. Therefore, as described above, the locking piece 55 can be protruded from and retracted into the outer circumferential surface of the finger 53.

As is understood from the above explanation, the small-diameter portion 53A of the finger 53 provided in the ATC 20 can be inserted (engaged) into the through hole 51 as the engagement hole provided in the divided upper tool 17, 17G. As illustrated in FIG. 6A, the recessed anti-rotation portions 67 that engage with the anti-rotation member 69 provided in the ATC 20 to achieve anti-rotation are provided on the front and back surfaces 17F of the divided upper tool 17, 17G.

Therefore, the finger 53 can be inserted (engaged) into the through hole 51 of the divided upper tool 17, 17G from the front side or the back side. Then, the stepped portion 53C of the finger 53 abuts on the front and back surface 17F, and the front surface 17F or the back surface 17F of the divided upper tool 17, 17G can be engaged with the locking piece 55 provided so as to be protruded from and retracted into the outer circumferential surface of the finger 53. The anti-rotation member 69 provided in the ATC 20 can engage with the anti-rotation portion 67 provided on the back surface or the front surface opposite to a surface engaged by the locking piece 55 to achieve anti-rotation of the divided upper tool 17, 17G.

That is, the small-diameter portion 53A of the finger 53 provided in the ATC 20 is inserted into the front-back directional through hole 51 provided in the divided upper tool 17, 17G from the front side or the back side, and the divided upper tool 17, 17G can be transported so as not to fall. In other words, the divided upper tool 17G can be installed to and removed from the upper tool holder 15 provided in the upper table 11 of the press brake by the ATC 20.

In a case where the divided upper tool 17, 17G is a gooseneck tool 17G, and the finger 53 is inserted from the small-diameter hole 51B side of the through hole 51 as illustrated in FIGS. 2 and 3, the stepped portion 51C of the through hole 51 becomes an engagement face that engages with the locking piece 55, as illustrated in FIG. 6A. Then, when the finger 53 is inserted from the large-diameter hole 51A side, an outer surface provided with an outer edge (see FIG. 6A) of the small-diameter hole 51B becomes an engagement face that engages with the locking piece 55.

That is, in a case where the finger 53 is inserted into the through hole 51 from the front side or the back side of the divided upper tool 17G, even in either case, the anti-rotation member 69 provided in the slide block 65 can engage with any of the anti-rotation portions 67 provided on both the front and back sides of the gooseneck tool 17G. Therefore, even in the case of gooseneck tool 17G, the divided upper tool can be installed and removed by using the ATC 20 without rotation.

As is already understood, in the case of the gooseneck tool 17G, as illustrated in FIG. 6A, the stepped portion 51C is provided between the large-diameter hole 51A and the small-diameter hole 51B of the through hole 51. Therefore, even in a case where the thickness of the thick portion 17A of the gooseneck tool 17G is large, easy installation and remove is possible.

As is understood from the above explanation, the divided upper tool 17, 17G can be installed to and removed from the upper tool holder 15 by using the ATC 20. The divided upper tool 17, 17G is provided with the circular through hole 51, into which the small-diameter portion 53A of the finger 53 of the ATC 20 is inserted, at the central portion in the lateral direction (left-right direction) of the thick portion 17A provided close to an attachment portion 79 provided on an upper part of the divided upper tool 17, 17G. Therefore, the configuration of the divided upper tool 17, 17G can be simplified, and the vertical dimension of the divided upper tool 17, 17G can be reduced as compared with a case where the through hole is a vertically long hole. Further, since the through hole 51 is a circular hole, it is easy to work the through hole 51.

As is already understood, a through hole and an anti-rotation portion are worked in a divided tool to be installed to the upper tool holder described in each of Patent Literatures 2 and 3 by post-working, so that the divided upper tool can be installed to and removed from even the upper tool holder described in each of Patent Literatures 2 and 3 by using the ATC.

In order to install the divided upper tool 17, 17G stored in the tool storage 19 to the upper tool holder 15 provided in the upper table 11 of the press brake 1 by the upper tool changer (ATC) 20, the ATC 20 is provided so as to freely reciprocate between the back position of the upper tool holder 15 and the tool storage 19.

The overall configuration of the tool storage 19 is almost the same as the configuration of the tool storage device described in, for example, Japanese Patent Laid-Open No. 2016-83673 (hereinafter referred to as patent publication).

In the patent publication, upper and lower tool changers are provided movably in the left-right direction along left-right directional guide rails provided in the upper and lower tables of the press brake. The patent publication describes tool exchange between the press brake and the tool changers by the upper and lower tool changers. That is, it is known to exchange tools between the press brake and the tool storage device.

This embodiment relates to the installation of the divided upper tool 17 to the upper tool holder 15. Therefore, a case where the divided upper tool 17 is installed to the upper tool holder 15 will be described. For example, the configuration described in the patent publication may be applied to the installation of the divided lower tool 7 to the lower tool installing portion 9. Therefore, the description of a case where the divided lower tool 7 is installed to the lower tool installing portion 9 will be omitted.

In order to install the divided upper tool 17 stored in the tool storage 19 to the upper tool holder 15 provided in the press brake 1, the ATC 20 is provided to freely reciprocate between the press brake 1 and the tool storage 19.

That is, the guide rail 21, the beam member 25, the rack 27, and the like that guide the ATC 20 in the left-right direction are supported by an extending frame 81 (see FIG. 1) that extends from the back side of the press brake 1) toward the tool storage. This extending frame 81 corresponds to a guide rail extension portion described in the patent publication.

The tool storage 19 has the same configuration as the tool storage device described in the patent publication. Therefore, roughly speaking, the tool storage 19 includes a stocker transport device 85 that lifts a desired stocker main body 83 stored in the tool storage 19 (the storage state is not illustrated) and transports the stocker main body to a predetermined position in front of the extending frame 81. Here, the predetermined position is a position of the stocker main body 83 illustrated in FIG. 1, that is, a position aligned with the upper tool holder 15 in the left-right direction (X-axis direction).

The stocker main body 83 has a configuration of detachably supporting the divided upper tool 17 in the left-right direction (X-axis direction). That is, the stocker main body 83 includes a tool installing groove (not illustrated) that opens downward and is elongated in the left-right direction. The stocker transport device 85 has a function of lifting the stocker main body 83 in the tool storage 19 to move the stocker main body 83 in the front-back direction, and transporting and positioning the stocker main body 83 to the predetermined position (the position aligned with the upper tool holder 15 in the left-right direction, the position illustrated in FIG. 1) corresponding to the ATC 20 that moves to the tool storage 19 side.

As described above, when the stocker main body 83 is positioned at the predetermined position on the front side of the extending frame 81 (the position illustrated in FIG. 1), the tool installing groove provided in the stocker main body 83 communicates (aligns) with one gap 15D (see FIG. 1) between an upper tool supporting portion 15C provided in the upper tool holder 15 and an upper tool clamp 15A or 15B in the left-right direction. Therefore, it is possible to move the divided upper tool 17 directly in the left-right direction between the upper tool holder 15 and the stocker main body 83.

The configurations of the stocker main body 83 and the stocker transport device 85 may be the same as those of the upper tool holder transporting means and the upper tool holder described in the patent publication. Therefore, the details of the stocker main body 83 and the stocker transport device 85 will be omitted.

In the above configuration, as schematically illustrated in FIG. 7, in the case of relation of W1=D or relation of W1≥D, the following is performed. Here, W1 denotes the width dimension in the left-right direction of each divided upper tool 17 supported by the stocker main body 83 stored in the tool storage 19. D denotes a gap (interval) of the upper tool holders 15 disposed at an appropriate interval.

That is, the stocker transport device 85 provided in the tool storage 19 lifts the desired stocker main body 83 in the tool storage 19 and transports the stocker main body 83 in the front-back direction. Then, the stocker main body 83 is positioned at the predetermined position on the front side of the extending frame 81. The ATC 20 is moved, and positioned behind a divided upper tool 17-1 which is closest to the press brake 1 in the stocker main body 83. Then, the small-diameter portion 53A of the finger 53 provided in the ATC 20 is inserted (engaged) into the through hole 51 provided in the divided upper tool 17-1, and the locking piece 55 protrudes from the outer circumferential surface. Then, the divided upper tool 17-1 is supported so as not to fall. In addition, the anti-rotation member 69 provided in the ATC 20 engages with the anti-rotation portion 67 of the divided upper tool 17-1 (not illustrated in FIG. 7) to achieve anti-rotation of the divided upper tool 17-1.

Thereafter, in order to remove the divided upper tool 17-1 from the left-right directional installing groove (not illustrated) provided in the stocker main body 83 to the press brake 1 side, the ATC 20 is moved to the press brake 1 side (in the left direction in FIG. 7). Then, the divided upper tool 17-1 is transported to the position of the upper tool holder 15 to which the divided upper tool 17-1 is installed, and the divided upper tool 17-1 is temporarily positioned at this position.

At this time, the upper tool clamps 15A, 15B (see FIG. 4) provided in all the upper tool holders 15 that are located between the upper tool holder 15 to which the divided upper tool 17 is installed, and the tool storage 19 such that the divided upper tool 17-1 freely passes in the left-right direction are in an open state. Therefore, the divided upper tool 17-1 is transported such that the attachment portion 79 provided on the upper part of the divided upper tool 17-1 passes in the left-right direction in the gap 15D between the upper tool supporting portion 15C provided on the upper tool holder 15 and the upper tool clamp 15A or 15B. Then, the divided upper tool 17-1 is temporarily positioned at the position of the upper tool holder 15 to which the divided upper tool is to be installed.

At this time, a vertical plane 79F provided in the attachment portion 79 provided in the divided upper tool 17-1 comes into surface contact with the upper tool supporting portion 15C, and the gap 15D is selected according to the orientation of the divided upper tool 17-1 such that anti-drop claws 15E provided in the upper tool clamps 15A and 15B engage with a left-right directional anti-drop groove 79G provided in the attachment portion 79. Then, the finger 53 is separated from the through hole 51 of the temporarily positioned divided upper tool 17-1. Thereafter, the attachment portion 79 of the temporarily positioned divided upper tool 17-1 is pressed and fixed to the upper tool supporting portion 15C by the upper tool clamp 15A or 15B provided on the upper tool holder 15. That is, the divided upper tool 17-1 is installed to the upper tool holder 15.

In a case where the width W1 of the divided upper tool 17-1 and the gap D of the upper tool holder 15 are almost equal, the position of the gap D is avoided and the divided upper tool 17-1 is installed. In this case, ends of the divided upper tool 17 installed to the upper tool holder 15 on both sides of the gap D may protrude into the gaps D, and both the ends may be combined in a contact state.

Then, the same transporting operation is repeated for the required number of the divided upper tools 17, and the divided upper tools 17-1 and 17 are disposed in contact with each other as illustrated in FIG. 8. By performing the reverse operation, the divided upper tool 17-1 can be returned from the upper tool holder 15 provided in the press brake to the stocker main body 83.

According to the aforementioned method, the small-diameter portion 53A of the rod-shaped (round bar-shaped) finger 53 provided in the ATC 20 is engaged in the circular through hole 51 as an example of the engagement hole provided at the central portion in the left-right direction (lateral direction) of the divided upper tool 17, and the divided upper tool 17 is transported. At the same time, the anti-rotation member 69 is engaged with the anti-rotation portion 67 provided in the divided upper tool 17, and the divided upper tool 17 is transported. Therefore, the divided upper tool 17 can be transported in a stable state, and the divided upper tool 17 can be quickly and smoothly installed to and removed from the upper tool holder 15.

As described above, the divided upper tool 17 can also be used, for example, by post-working the round hole through hole 51 and the anti-rotation portion 67 in a normally general divided upper tool that is installed to and removed from the upper tool holder 15. Therefore, the divided upper tool 17 can be manually installed to and removed from the upper tool holder 15 as in a conventional case. In addition, the divided upper tool 17 can be installed and removed by the ATC 20. Therefore, the versatility of installation and remove of the divided upper tool 17 to and from the upper tool holder 15 is improved.

FIG. 9 illustrates a stocker main body 87 according to a second embodiment. In a configuration of this stocker main body 87 different from the configuration of the stocker main body 83 according to the first embodiment is that a plurality of cutouts 89A, 89B, 89C, 89D are provided at appropriate intervals in the X-axis direction. The above cutouts 89A, 89B, 89C, 89D are formed so as to cross, in the front-back direction, a left-right direction tool installing groove 91 that detachably supports divided upper tools 17 in the stocker main body 87.

That is, the cutout 89A between an installing position 93A of the divided upper tools 17 each having a large width dimension and an installing position 93B of the divided upper tools 17 each having a medium width dimension, which are detachably installed to the stocker main body 87, is formed so as to be a cutout large enough to allow each divided upper tool 17 having the large width dimension to pass in the vertical direction and/or in the front-back direction. The cutout 89B between the installing position 93B and an installing position 93C of the divided upper tools 17 each having a small width dimension is formed so as to be a cutout having such a medium width that each divided upper tool 17 having the medium width dimension can pass in the vertical direction and/or in the front-back direction.

The cutout 89C between the installing position 93C and an installing position 93D of the divided upper tools 17 each having an extremely small width dimension is formed so as to be a cutout having such a small width that each divided upper tool 17 having the small width dimension can pass in the vertical direction and/or in the front-back direction. The cutout 89D between an installing position 93E, at which the divided upper tools 17 each having the extremely small width dimension are installed adjacent to the installing position 93D, and the installing position 93D is formed so as to be a cutout having such an extremely small width dimension that each divided upper tool 17 having the extremely small width dimension can pass in the vertical direction and/or in the front-back direction.

As is understood from the above configuration, the divided upper tools 17 supported by the stocker main body 87 can be moved along the tool installing groove 91 in the left-right direction, so that each divided upper tool 17 can be positioned at the position of any of the cutouts 89A to 89D each having a corresponding width dimension or larger width dimension, and removed from the stocker main body 87 in the vertical direction or in the front-back direction. Therefore, when the divided upper tools 17 are installed to and removed from the stocker main body 87 by the ATC 20, the respective divided upper tools 17 can be installed and removed by using the positions of the cutouts 89A to 89D corresponding to the width dimensions of the divided upper tools 17.

Therefore, it is possible to suppress a moving distance of each divided upper tool 17 from the stocker main body 87 in the left-right direction, and it is possible to efficiently install and remove the divided upper tools 17. In other words, each divided upper tool 17 can be removed from the stocker main body 87, and promptly installed to the upper tool holder 15 of the press brake 1.

The width dimensions W1 of the small-width divided upper tools 17 and the extremely small-width divided upper tools 17 installed at the installing positions 93C, 93D, 93E in the stocker main body 87 are each smaller than the gap D of the upper tool holder 15 installed to the upper table 11 of the press brake 1. That is, D>W1. Therefore, the divided upper tools 17 can be installed to the upper tool holder 15 as follows.

That is, the ATC 20 is positioned on the back side of a position corresponding to the divided upper tool 17 at the installing position 93C, 93D or 93E supported by the stocker main body 87 positioned at a predetermined position in front of the extending frame 81. Then, the small-diameter portion 53A of the finger 53 is inserted into the through hole 51 of the divided upper tool 17 on the right or left end side at the installing position 93C, 93D or 93E, and the locking piece 55 provided in the finger 53 protrudes from the outer circumferential surface of the finger 53. Then, the anti-rotation member 69 is engaged with the anti-rotation portion 67 of the divided upper tool 17 to achieve anti-rotation of the divided upper tool 17. Thereafter, the divided upper tool 17 moves to the position of the cutout 89B, 89C or 89D.

Figure 10:
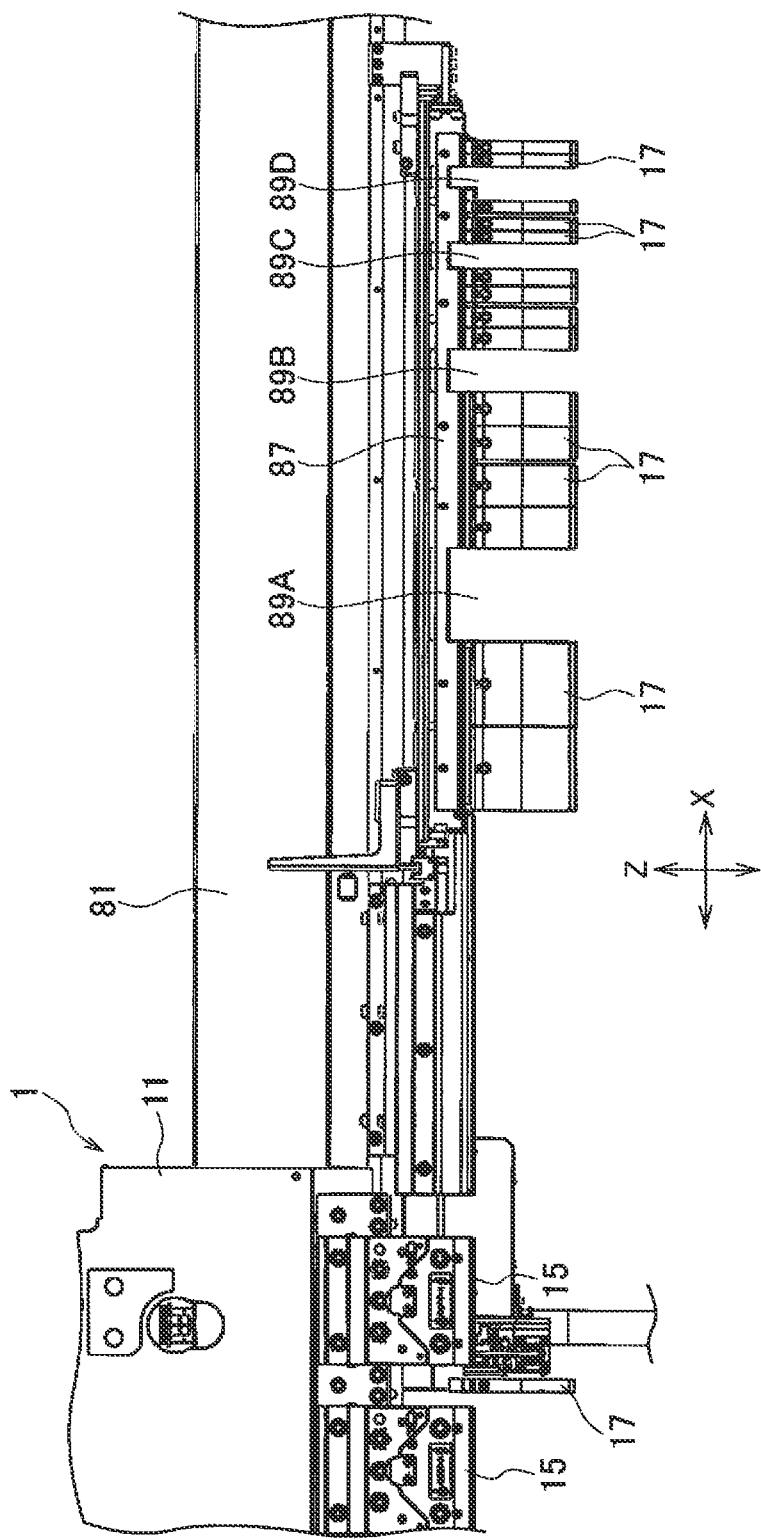
FIG. 10 is an explanatory view of an action in a case where the divided upper tool supported by the stocker main body is installed to the upper tool holder.

The divided upper tool 17 is taken out from the cutout 89B, 89C or 89D to the back side. Thereafter, the ATC 20 is moved in the left-right direction, and the divided upper tool 17 is temporarily positioned at a position corresponding to a gap adjacent to the upper tool holder 15 to which the divided upper tool 17 is installed (see FIG. 10). Thereafter, the divided upper tool 17 is moved forward, and temporarily positioned in the gap adjacent to the upper tool holder 15 to which the divided upper tool 17 is installed.

The attachment portion 79 of this temporarily positioned divided upper tool 17 is moved in the left-right direction and temporarily positioned in the gap 15D between the upper tool supporting portion 15C and the upper tool clamp 15A or 15B provided in the upper tool holder 15 to which the divided upper tool 17 is installed. Then, the finger 53 is pulled out (disengaged) from the through hole 51 of the divided upper tool 17, which is temporarily lightly fixed by the upper tool clamp 15A or 15B. Thereafter, the attachment portion 79 of the divided upper tool 17 is pressed and fixed to the upper tool supporting portion 15C by the upper tool clamp 15A or 15B.

When the finger 53 is pulled out from the through hole 51 of the divided upper tool 17, it is also possible to firmly fix the divided upper tool 17 in advance by the upper tool clamp 15A, 15B.

As illustrated in FIG. 1, for example, a plurality of the small-width divided upper tools 17 or extremely-small-width divided upper tools 17 are usually installed to the one upper tool holder 15. In this case, it is desirable that the adjacent divided upper tools 17 are in contact with each other without being separated from each other. Therefore, the divided upper tools 17 are each slightly loosely held so as not to fall, and the divided upper tools 17 are each sequentially brought into contact with the one upper tool holder 15 each time the divided upper tool 17 is disposed (installed). Alternatively, after the installation of the divided upper tools 17 on the upper tool holder 15, all the divided upper tools 17 can be appropriately gathered from both of the left and right sides and brought into contact with each other in a collective manner.

Figure 11:
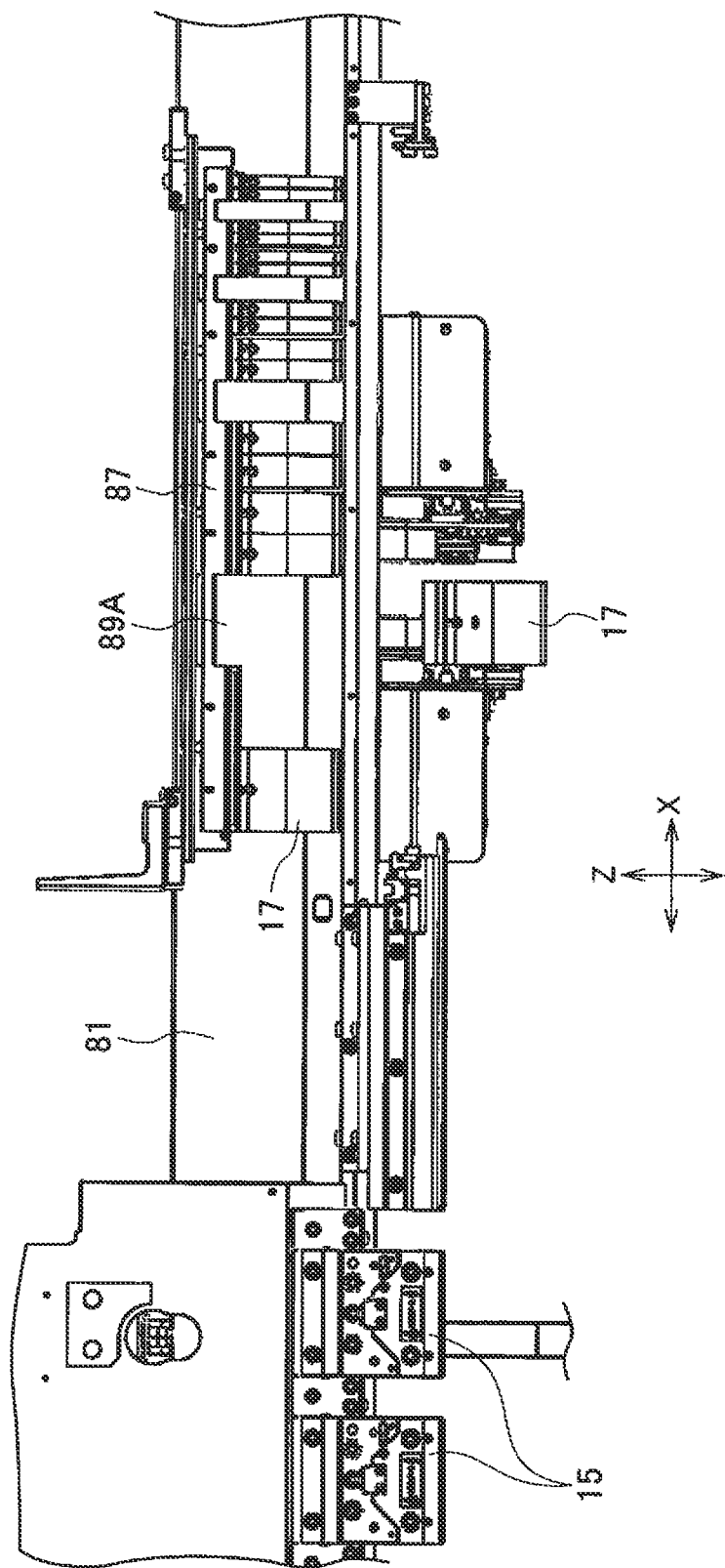
FIG. 11 is an explanatory view of an action in a case where the divided upper tool supported by the stocker main body is installed to the upper tool holder.

In the stocker main body 87, the divided upper tools 17 installed to the stocker main body 87 move in the left-right direction and are temporarily positioned at the positions of the cutouts 89A to 89D having the corresponding size, so that the divided upper tools 17 can be taken out (removed) to the back side. Therefore, the divided upper tool 17, which has a relatively large width dimension, is temporarily positioned at the position corresponding to the cutout 89A having the corresponding size. As illustrated in FIG. 11, by raising the stocker main body 87, the divided upper tool 17 can be taken out relatively downward from the stocker main body 87.

Figure 12:
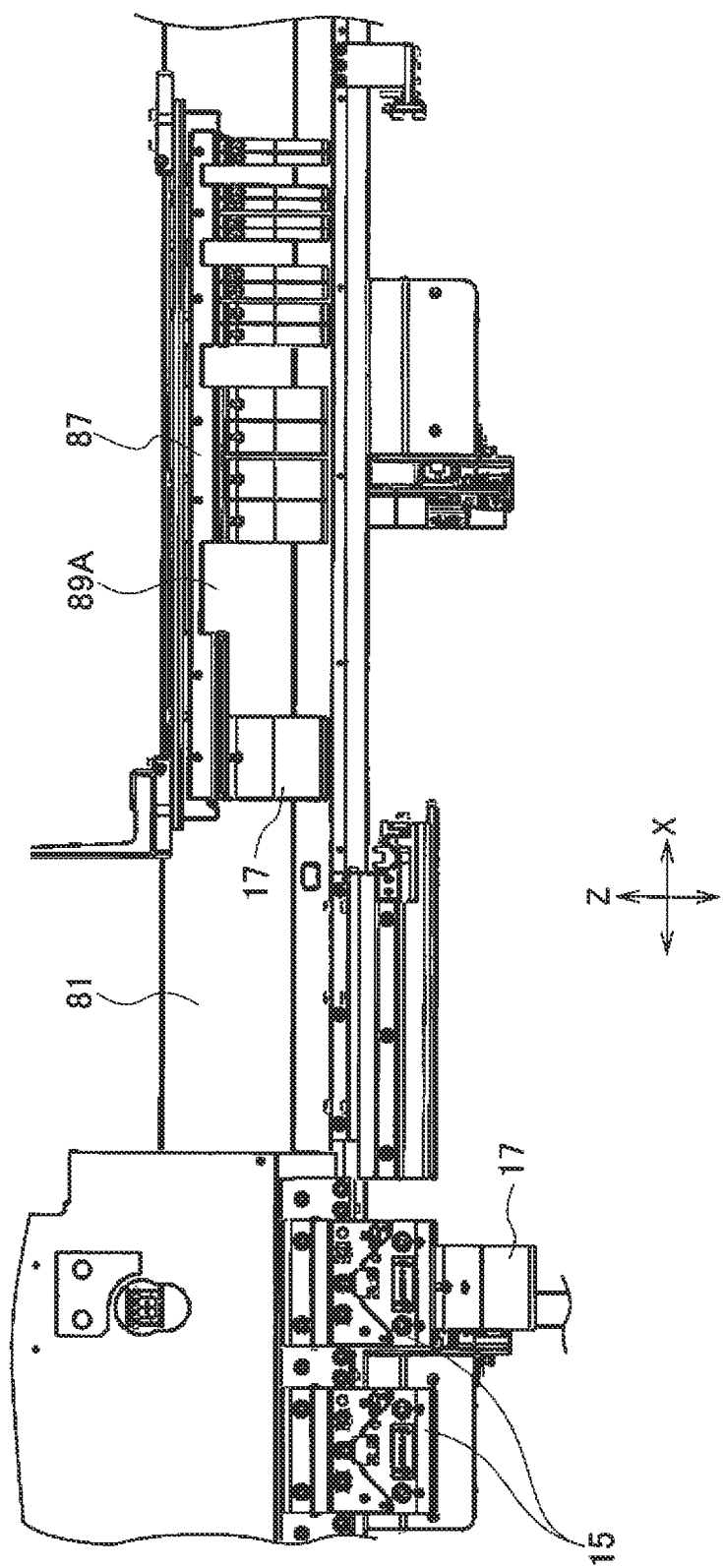
FIG. 12 is an explanatory view of an action in a case where the divided upper tool supported by the stocker main body is installed to the upper tool holder.

Therefore, the ATC 20 is moved to the press brake 1 side at the position where the divided upper tool 17 is taken out relatively to the lower side. Therefore, as illustrated in FIG. 12, the taken divided upper tool 17 can be directly installed to the upper tool holder 15 at a desired position provided in the press brake 1. That is, the divided upper tool 17 having a width dimension larger than that of the gap D between the upper tool holders 15 provided adjacent to the press brake 1 can be easily handled.

As is already understood, the divided upper tool 17 can be removed backward by positioning the divided upper tool 17 at the position of the cutout provided in the stocker main body 87. In addition, the divided upper tool 17 can be removed relatively downward by raising the stocker main body 87. Therefore, the divided upper tool 17 can be installed and removed by two operations, namely, removing the divided upper tool 17 backward to move the divided upper tool 17 to the press brake 1 side, and moving the divided upper tool 17 to the press brake side at a position where the divided upper tool 17 is removed relatively downward.

As is understood from the above explanation, when the divided upper tool 17 is installed to each of the upper tool holders 15 provided to be spaced at appropriate intervals in the left-right direction in the lower portion of the upper table 11 of the press brake 1, by using the tool changer (ATC), the small-diameter portion 53A of the round bar-shaped finger 53 provided in the ATC 20 is inserted (engaged) into the circular through hole (engagement hole) 51 provided at the central portion in the lateral direction of the divided upper tool 17.

Therefore, the divided upper tool 17 is supported by the ATC 20 in a stable state so as not to fall. The support configuration of the ATC 20 and the divided upper tool 17 is a simple configuration in which the rod-shaped finger 53 is inserted into the circular through hole 51. Therefore, the configuration of ATC 20 and the configuration of the divided upper tool 17 can be simplified.

When the divided upper tool 17 having a small width dimension is installed to the upper tool holder 15, the divided upper tool 17 is positioned in the gap adjacent to the upper tool holder 15 to which the divided upper tool 17 is installed, by the ATC 20. Then, the ATC 20 is laterally moved in the left-right direction, and the divided upper tool 17 is installed to the upper tool holder 15 to which the divided upper tool 17 is installed. Therefore, the divided upper tool 17 can be efficiently installed to the upper tool holder 15 to which the divided upper tool 17 is installed.

The tool changer only needs to be provided with the round bar-shaped finger 53 that is inserted into the circular through hole 51 provided in the divided upper tool 17, and the configuration can be simplified.

The stocker main body 87 has a configuration in which the cutouts 89A to 89D corresponding to the respective width dimensions of the supported divided upper tools 17 are provided at the appropriate intervals. Therefore, the divided upper tools 17 can be promptly removed from the stocker main body 87, by positioning the divided upper tools 17 supported by the stocker main body 87 at the corresponding cutouts 89A to 89D.

The present invention is not limited to the embodiments as described above, and can be implemented in other forms by making appropriate changes. That is, for example, appropriately sized cutouts are formed at appropriate intervals in the lower portion supporting member of an exchange upper tool supporting member that supports the divided upper tools described in Patent Literature 1. A configuration is also possible in which the divided upper tools can be each removed from this cutout.

The tool changer is not limited to the aforementioned ATC, and for example, a manipulator such as an industrial robot can also be used.

FIG. 1 illustrates a case where the upper tool holders 15 are provided at equal intervals. However, the upper tool holder 15 at the appropriate position is removed. Then, it is also possible to increase the interval between the adjacent upper tool holders 15, and install and remove the divided upper tool having a large width dimension by using the position of this increased interval.

The disclosures of this application are relevant to the subject matter described in Japanese Patent Application No. 2018-134168 filed on Jul. 17, 2018, Japanese Patent Application No. 2019-111277 filed on Jun. 14, 2019, Japanese Patent Application No. 2018-140886 filed on Jul. 27, 2018, Japanese Patent Application No. 2019-109717 filed on Jun. 12, 2019, Japanese Patent Application No. 2018-134151 filed on Jul. 17, 2018, Japanese Patent Application No. 2018-169366 filed on Sep. 11, 2018, Japanese Patent Application No. 2019-126935 filed on Jul. 8, 2019, Japanese Patent Application No. 2019-087437 filed on May 7, 2019, and Japanese Patent Application No. 2019-092892 filed on May 16, 2019, all disclosures of which are incorporated herein by reference.

The invention claimed is:

1. A divided upper tool installing method for installing divided upper tools to a plurality of upper tool holders by using a tool changer,
   wherein the upper tool holders are each disposed in a lower portion of an upper table of a press brake, wherein each of the upper tool holders is spaced at an interval in a left-right direction from the adjacent upper tool holder by a corresponding gap, wherein the divided upper tools each include a respective engagement hole provided at a central, in the left-right direction, portion of the respective tool,
   the divided upper tool installing method comprising:
   (a) providing a tool stocker supporting the divided upper tools;
   (b) engaging a rod-shaped finger of the tool changer in the engagement hole of each of the divided upper tools supported by the tool stocker, and removing the divided upper tools from the tool stocker one by one;
   (c) temporarily positioning, via the tool changer, one of the removed divided upper tools in the gap between one of the upper tool holders, to which the one of the removed divided upper tools is to be installed, and an adjacent one of the upper tool holders;
   (d) moving the temporarily positioned divided upper tool in the left-right direction, and temporarily positioning an attachment portion of the one of the removed divided upper tools between an upper tool supporting portion provided in the upper tool holder to which the one of the removed divided upper tools is to be installed and an upper tool clamp of the upper tool holder to which the one of the removed divided upper tools is to be installed;
   (e) separating the finger from the engagement hole of the one of the removed divided upper tools; and
   (f) fixing the temporarily positioned attachment portion of the one of the removed divided upper tools to the upper tool holder; and
   (g) repeating steps (c) through (f) for each of the divided upper tools removed from the tool stocker.

2. The divided upper tool installing method according to claim 1,
   wherein plural ones of the divided upper tools are in contact with each other in the press brake.

* * * * *